US009952669B2

(12) United States Patent
Rihn et al.

(10) Patent No.: US 9,952,669 B2
(45) Date of Patent: Apr. 24, 2018

(54) DYNAMIC RENDERING OF ETCHING INPUT (71) Applicant: Immersion Corporation, San Jose, CA (US)

(72) Inventors: William S. Rihn, San Jose, CA (US); David M. Birnbaum, Oakland, CA (US); Anthony Chad Sampanes, Redwood City, CA (US)

(73) Assignee: IMMERSION CORPORATION, San Jose, CA (US)

( * ) Notice: Subject to any disclaimer, the term of this patent is extended or adjusted under 35 U.S.C. 154(b) by 25 days.

(21) Appl. No.: 15/133,823

(22) Filed: Apr. 20, 2016

(65) Prior Publication Data
US 2016/0313840 A1 Oct. 27, 2016

Related U.S. Application Data (60) Provisional application No. 62/150,499, filed on Apr. 21, 2015.

(51) Int. Cl.
G06F 3/041 (2006.01)
G06F 3/01 (2006.01)
G06T 11/20 (2006.01)
G06F 3/044 (2006.01)
G06F 3/0484 (2013.01)

(52) U.S. Cl.
CPC .............. G06F 3/016 (2013.01); G06F 3/044 (2013.01); G06F 3/04845 (2013.01); G06T 11/20 (2013.01)

(58) Field of Classification Search
CPC . G06F 3/01; G06F 3/016; G06F 3/041; G06F 3/0416; G06F 3/048; G06F 3/04812; G06F 2203/04105; G06T 19/006; G08B 6/00
See application file for complete search history.

(56) References Cited

U.S. PATENT DOCUMENTS

| 2002/0033795 A1* | 3/2002 | Shahoian | G06F 1/1616 345/156 |
| 2005/0212757 A1* | 9/2005 | Marvit | G06F 1/1626 345/156 |
| 2006/0161871 A1* | 7/2006 | Hotelling | G06F 3/0485 715/863 |
| 2007/0043725 A1* | 2/2007 | Hotelling | G06F 3/016 |
| 2009/0227296 A1* | 9/2009 | Kim | G06F 3/016 455/566 |
| 2010/0128002 A1* | 5/2010 | Stacy | G06F 3/016 345/174 |
| 2010/0231550 A1* | 9/2010 | Cruz-Hernandez | G06F 3/016 345/174 |
| 2010/0296748 A1* | 11/2010 | Shechtman | G06T 11/00 382/254 |
| 2011/0018697 A1* | 1/2011 | Birnbaum | A63F 13/10 340/407.2 |

(Continued)

FOREIGN PATENT DOCUMENTS

WO 2014112777 A1 7/2014

Primary Examiner — Joe H Cheng
(74) Attorney, Agent, or Firm — Miles & Stockbridge P.C.

(57) ABSTRACT

Systems and methods that dynamically render etching inputs are provided, and include a touch surface having a sensor and configured to detect user input, and a non-transitory memory, wherein the non-transitory memory includes instructions for capturing an etching input that is applied to an image or video file, determining a haptic effect that corresponds to the etching input, the haptic effect depending on a type of etching input, and transmitting a modified image or modified video file that includes the etching input and the haptic effect.

20 Claims, 8 Drawing Sheets

(56) References Cited

U.S. PATENT DOCUMENTS

| | | | |
|---|---|---|---|
| 2011/0141052 A1* | 6/2011 | Bernstein | G06F 3/016 345/174 |
| 2011/0264491 A1* | 10/2011 | Birnbaum | G06F 3/016 705/14.4 |
| 2012/0084467 A1* | 4/2012 | Birnbaum | G06F 3/016 710/16 |
| 2012/0127088 A1 | 5/2012 | Pance et al. | |
| 2012/0194466 A1 | 8/2012 | Posamentier | |
| 2012/0276956 A1* | 11/2012 | Tanioka | H04M 19/047 455/566 |
| 2013/0069954 A1* | 3/2013 | Tristram | G06T 13/80 345/473 |
| 2013/0176258 A1* | 7/2013 | Dahl | G01S 7/5273 345/173 |
| 2013/0222280 A1* | 8/2013 | Sheynblat | G06F 3/016 345/173 |
| 2014/0062927 A1 | 3/2014 | Hirose et al. | |
| 2014/0118127 A1* | 5/2014 | Levesque | G06F 3/016 340/407.2 |
| 2014/0139450 A1* | 5/2014 | Levesque | G08B 6/00 345/173 |
| 2015/0070154 A1* | 3/2015 | Levesque | G06F 3/165 340/407.1 |
| 2015/0097786 A1 | 4/2015 | Behles et al. | |
| 2015/0145657 A1* | 5/2015 | Levesque | G06F 3/016 340/407.2 |
| 2016/0034148 A1* | 2/2016 | Wilson | G06F 3/04842 715/835 |

* cited by examiner

DYNAMIC RENDERING OF ETCHING INPUT

PRIORITY APPLICATION

This application claims the benefits of U.S. Provisional Patent Application No. 62/150,499, which was filed on Apr. 21, 2015, and is hereby incorporated by reference in its entirety.

FIELD OF INVENTION

The embodiments of the present invention are generally directed to electronic devices, and more particularly, to electronic devices and applications that produce and/or exchange haptic effects.

BACKGROUND

Electronic device manufacturers strive to produce a rich interface for users. Conventional devices use visual and auditory cues to provide feedback to a user. In some interface devices, kinesthetic feedback (e.g., active and resistive force feedback) and/or tactile feedback (e.g., vibration, texture, and heat) is also provided to the user, more generally and collectively known as "haptic feedback" or "haptic effects." Haptic feedback can provide additional cues that enhance and simplify user interfaces. Specifically, vibration effects, or vibrotactile haptic effects, may be useful in providing cues to users of electronic devices to alert the user to specific events, or provide realistic feedback to create greater sensory immersion within a simulated or virtual environment.

An increasing number of devices, such as smartphones and tablets, include hardware, such as actuators, for generating haptic effects. Haptic effects, in particular, can enhance the audio/video experience on these example devices. For example, haptic effect accompaniment to an audio/video track can allow a viewer to "feel" an engine roaring in a car, explosions, collisions, and the shimmering feeling of sunlight. Other devices in which a user interacts with a user input element to cause an action also may benefit from haptic feedback or haptic effects. For example, such devices may include medical devices, automotive controls, remote controls, trackpads, and other similar devices.

SUMMARY OF THE INVENTION

Embodiments of the present invention are generally directed toward electronic devices configured to dynamically render etching inputs that substantially improve upon the related art.

In one example, the systems and methods that dynamically render the etching inputs include a touch surface comprising a sensor and configured to detect user input, and a non-transitory memory, wherein the non-transitory memory comprises instructions for capturing an etching input that is applied to an image or video file, determining a haptic effect that corresponds to the etching input, the haptic effect depending on a type of etching input, and transmitting a modified image or modified video file that includes the etching input and the haptic effect.

Additional features and advantages of the invention will be set forth in the description which follows, and in part will be apparent from the description, or may be learned by practice of the invention. The advantages of the embodiments of the present invention will be realized and attained by the structure particularly pointed out in the written description and claims hereof as well as the appended drawings. It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

In the various embodiments, systems and methods for dynamically rendering the etching input are provided. As described herein, etching is a tactile enhanced drawing experience that encapsulates the user's gestures within one or more haptic effects. For example, the etching may be an electronic drawing that mimics one or more brush types such as paint brushes, markers, erasures, lasers, and the like. In another example, the physical movement of the host electronic device, such as shaking the device and/or drawing a design in three dimensional spaces with the device (e.g., a heart, square, or other shapes) may be used to generate the etching input. In some instances, the etching input may be applied to enhance the exchange of interactive media messages via a tactile chat or messaging application. For example, embodiments provide techniques for capturing the etching input and enabling the dynamic rendering of the captured etching input in conjunction with haptic effects. Additionally, or alternatively, the speed, pressure, and/or other parameters of the captured etching input may be modified in advance of rendering playback and in order to further enhance the haptic experience of the user.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, a variety of user interfaces and methods for using an electronic device are described. In some embodiments, the electronic device is a portable device (e.g., a game controller, console, mobile phone, smartphone, tablet, wearable watch, smart eyeglasses, and/or other peripheral). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
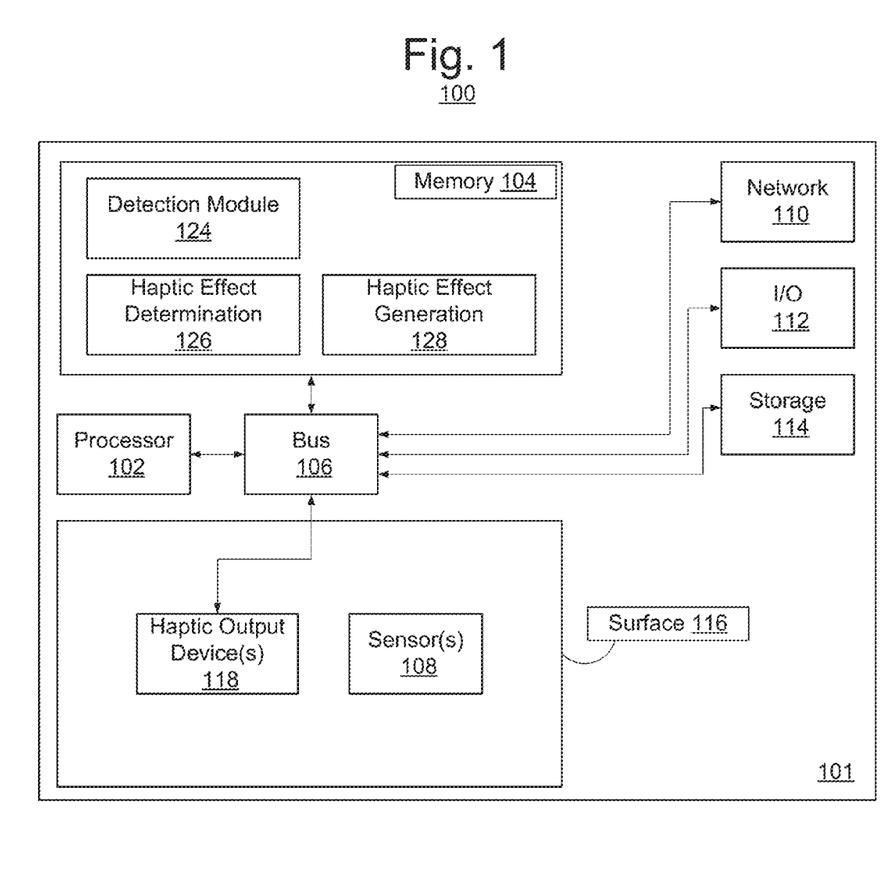
FIG. 1 illustrates a block diagram of a haptic enabled touch surface according to an example embodiment of the present invention.

FIG. 1 illustrates a block diagram of a system 100 for a haptically enabled touch sensitive surface according to an example embodiment of the present invention. As shown in FIG. 1, system 100 includes a computing device 101 having a processor 102 interfaced with other hardware, such as a memory 104, via a bus 106. In this example configuration, computing device 101 further includes one or more network interface devices 110, input/output ("I/O") interface components 112, additional storage 114, and a touch surface 116.

Touch surface 116 or base device (e.g., a tablet or trackpad) may be integrated with or coupled to computing device 101. Touch surface 116 includes any surface (e.g., touchpad, touchscreen, etc.) that is configured to sense input of the user. One or more sensors 108 are configured to detect touch at the pressure sensitive areas when one or more objects (e.g., finger, hand, stylus, brush, etc.) contact touch surface 116 and provide appropriate data for use by processor 102. Sensors 108 may be configured to sense either a single touch and/or multiple simultaneous touches on touch surface 116.

Any suitable number, type, and/or arrangement of sensors 108 can be used. For example, resistive and/or capacitive sensors may be embedded in touch surface 116 and used to determine the location of a touch and other information, such as pressure. In another example, sensors 108 may include optical sensors that are configured to determine the touch positions. In some embodiments, sensors 108 may be configured to detect multiple aspects of the user interaction. For example, sensors 108 may detect the speed and pressure of a user interaction.

Haptic output devices 118, in communication with processor 102, may be provided within touch surface 116. Additional haptic output devices 118 may be disposed at touch surface 116 and/or other components of the computing device 101. In some embodiments, haptic output device 118 is configured to output a haptic effect simulating a variety of textures on touch surface 116. For example, a variety of brushes, canvases, erasures, markers, lasers, and other textures may be simulated. In another example, the perceived coefficient of friction may be varied by vibrating touch surface 116 at different frequencies. Additionally, or alternatively, haptic output device 118 may provide vibrotactile haptic effects, electrostatic friction haptic effects, temperature variation, and/or deformation haptic effects along touch surface 116. Some haptic effects may utilize an actuator coupled to the housing (not shown) of computing device 101, and some haptic effects may use multiple actuators in sequence or in concert.

Haptic output devices 118 may use electrostatic attraction, for example by use of an electrostatic surface actuator, to simulate a texture on the surface of touch surface 116 or to vary the coefficient of friction the user feels when moving his or her finger across touch surface 116. For example, haptic output devices 118 may be an electrovibrotactile device that applies voltages and currents instead of mechanical motion to generate a haptic effect. In such an embodiment, the electrostatic actuator may include a conducting layer and an insulating layer. In such an embodiment, the conducting layer may be any semiconductor or other conductive material, such as copper, aluminum, gold, or silver. The insulating layer may be glass, plastic, polymer, or any other insulating material. Furthermore, processor 102 may operate the electrostatic actuator by applying an electrical signal to the conducting layer. The electric signal may be an AC signal that, in some embodiments, capacitively couples the conducting layer with an object near or touching touch surface 116.

In some embodiments, the capacitive coupling may simulate a friction coefficient or texture on the surface of touch surface 116. For example, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116. Furthermore, in some embodiments, an electrostatic actuator may be used in conjunction with traditional actuators to vary the simulated texture on the surface of touch surface 116 or output other effects. For example, the actuators may vibrate to simulate a change in the texture of the surface of touch surface 116, while an electrostatic actuator may simulate a different texture on the surface of touch surface 116.

In some embodiments, an electrostatic actuator may be used to generate a haptic effect by stimulating parts of the body or objects near or touching touch surface 116. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches touch surface 116 and moves his or her finger along the surface, the user may sense a texture of prickliness, graininess, bumpiness, roughness, stickiness, or some other texture.

Various actuators may be used as haptic output devices 118, and other devices may be used. Haptic output devices 118 may be, for example, an electric motor, an electromagnetic actuator, a voice coil, a shape memory alloy, an electroactive polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Processor 102 may be one or more general or specific purpose processors to perform computation and control functions of system 100. Processor 102 may include a single integrated circuit, such as a microprocessing device, or may include multiple integrated circuit devices and/or circuit boards working in cooperation to accomplish the functions of processor 102. In addition, processor 102 may execute computer programs, such as an operating system applications stored within memory 104.

In some instances, processor 102 can determine which haptic effects are to be rendered and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations or other types of haptic effects on system 100.

Non-transitory memory 104 may include a variety of computer-readable media that may be accessed by processor 102. In the various embodiments, memory 102 may include volatile and nonvolatile medium, removable and non-removable medium. For example, memory 104 may include any combination of random access memory ("RAM"), dynamic RAM ("DRAM"), static RAM ("SRAM"), read only memory ("ROM"), flash memory, cache memory, and/or any other type of non-transitory computer-readable medium.

Network device 110 is configured to transmit and/or receive data with remote sources. Network device 110 may enable connectivity between a processor 102 and other devices by encoding data to be sent from processor 102 to another device over a network (not shown) and decoding data received from another system over the network for processor 102. For example, network device 110 may include a network interface card that is configured to provide wireless network communications. A variety of wireless communication techniques may be used including infrared, radio, Bluetooth, Wi-Fi, and/or cellular communications. Alternatively, network device 110 may be configured to provide wired network connection(s), such as an Ethernet/Internet connection.

I/O components 112 may be used to facilitate connection to peripheral devices such as one or more displays, keyboards, mice, speakers, microphones, and/or other hardware used to input data or output data, such as a stylus. Storage 114 represents nonvolatile storage such as magnetic, optical, or other storage media included in computing device 101.

Returning to memory 104, illustrative program components 124, 126, and 128 are depicted to illustrate how a device can be configured in some embodiments to provide haptic effects in conjunction with etching inputs, and all other functionality described herein. In this example, detection module 124 configures processor 102 to monitor touch surface 116 via sensors 108 to determine the position of one or more touches. For example, module 124 may sample sensors 108 in order to track the presence or absence of touches. If touches are present, sensors 108 may track one or more of the location, path, velocity, acceleration, pressure and/or other characteristics of the touches.

Haptic effect determination module 126 analyzes data regarding touch or contact characteristics to select haptic effects for rendering. For example, haptic effects may be determined by characteristics of touch surface 116. Alternatively, or additionally, this determination may be made based on characteristics of the touches, such as the location of contact, number of contacts, time of contact, pressure of contact, activity of contact, or features associated with haptic effects. Different haptic effects may be selected based on the location of each touch in order to simulate the presence of a feature by simulating a texture on a surface of touch surface 116 or generally another type of haptic effect.

Haptic effect generation module 128 is configured to cause processor 102 to generate and transmit haptic signals to haptic output devices 118. For example, generation module 128 may access stored waveforms or commands to send to haptic output devices 118. As another example, haptic effect generation module 128 may receive a desired type of texture and utilize signal processing algorithms to generate an appropriate signal to send to haptic output devices 118. As yet another example, a desired texture may be indicated along with target coordinates for the texture and an appropriate waveform sent to one or more actuators to generate appropriate displacement of touch surface 116 (and/or other device components).

Although shown as a single system, the functionality of system 100 may be implemented as a distributed system. For example, system 100 may be part of a device (e.g., personal computer, console, video game console, etc.), and system 100 may provide haptic effect functionality for the device. In another example, system 100 may be separate from the device, and may remotely provide the aforementioned functionality for the device.

Figure 2:
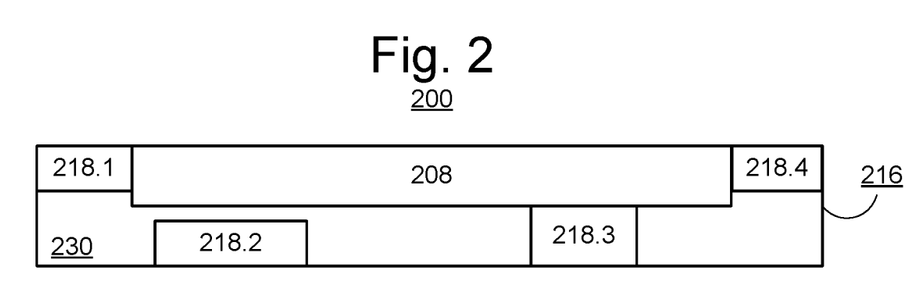
FIG. 2 illustrates a cross-sectional view of the touch surface according to an example embodiment of the present invention.

FIG. 2 illustrates a cross-sectional view 200 of a touch surface 216 according to an example embodiment of the present invention. As shown in FIG. 2, touch surface 216 includes sensors 208, a plurality of haptic output devices 218.1-218.4, and a substrate 230. Haptic output devices 218.1-218.4 may be integrally formed as part of substrate 230. Additionally, or alternatively, haptic output devices of the corresponding host device may be used. It should be understood that numerous configurations of sensors 208 and haptic output devices 218.1-218.4 are feasible, and that the configuration depicted in FIG. 2 is only one example. Furthermore, it should be understood that each of the haptic output devices may comprise an actuator or any of the other haptic output devices described above.

Figure 3:
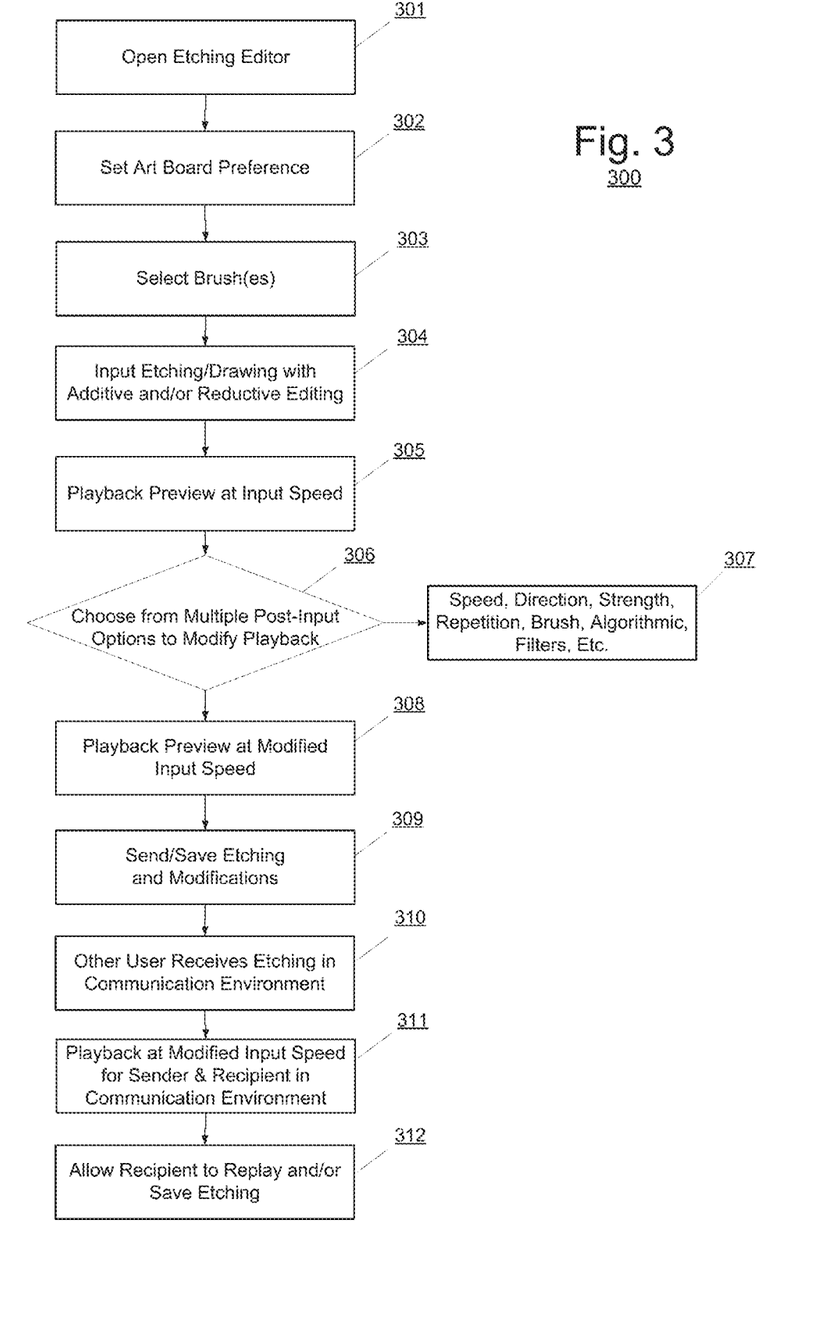
FIG. 3 illustrates a flow diagram of the functionality for dynamically rendering an etched input according to an example embodiment of the present invention.

FIG. 3 illustrates a flow diagram of functionality 300 for dynamically rendering the etching input according to an example embodiment of the present invention. In some instances, the functionality of the flow diagram of FIG. 3 (and FIGS. 4 and 5 below) is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

Figure 6:
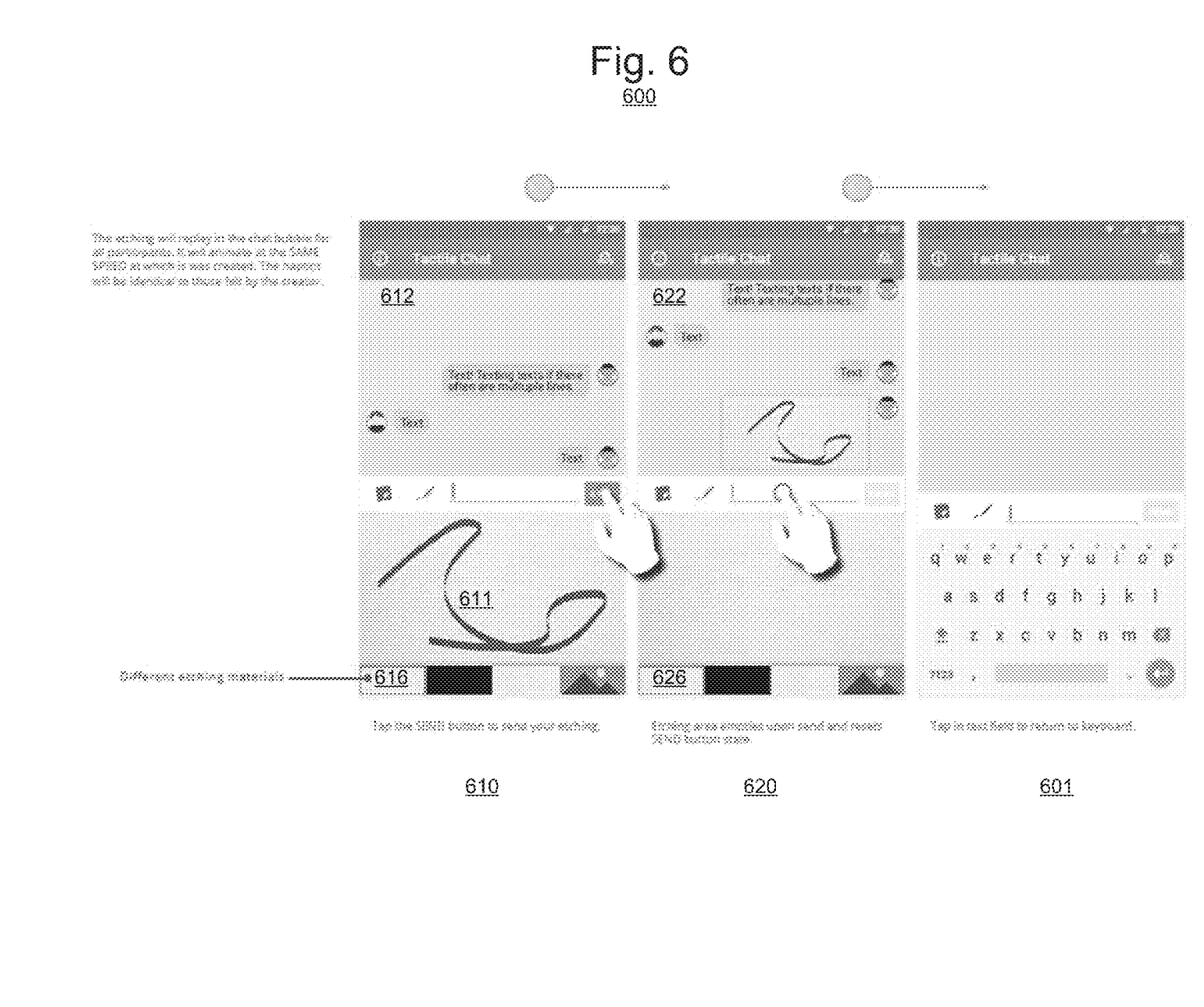
FIG. 6 illustrates a user interface for a haptic-enabled etching and messaging application according to an example embodiment of the present invention.

At the outset, functionality 300 enables the user to open and execute modules of an etching editor, at 301. The etching editor may be a standalone application, or alternatively, may be implemented as part of a media editing application. For example, the etching editor may be incorporated as part of a messaging or tactile chat application (as depicted in FIG. 6), Next, at 302, functionality 300 enables the user to select a board or canvas to which the etching input may be applied. For example, the board may include various media items, such as static images, videos, and the like. In addition, functionality 300 enables the user to select one or more electric "brushes" (e.g., paint brush, marker, erasure, laser, etc.), at 303. Each brush type may include a corresponding haptic profile that may be retrieved from a haptic library (not shown) upon selection. In addition, the board may include different textured backgrounds (e.g., paper, canvas, blackboard, blur, etc.) that vary and enhance the interaction with the selected brushes. In the example depicted in FIG. 6, the user may generate etching input 611 using one or more selected brushes and a selected board or background 616.

Returning to FIG. 3, the user may input one or more etchings or drawings on the selected board and use one or more selected brushes, at 304. Brushes may be applied to the board using fingers or a stylus, for example. Here, the etching input may apply additive and/or reductive edits to the selected board. In addition, the user may optionally render the playback of the etching input. In other words, the user may preview the etching input, at 305. The initial playback of the etching input may be rendered as originally input by the user (i.e., without altering the parameters of the etching input).

Next, functionality 300 enables the user to select one or more post input options that modify the etching input, at 306. For example, the user may select to alter one or more of the speed, pressure, direction, strength, repetition, brush, algorithm filters, and the like, at 307. The modified etching input may be rendered or previewed, at 308. For example, an example brush algorithm filter may cause an increase in the speed to increase the frequency (e.g., pitch) of the haptic effects by shortening the duration between haptic effects and/or the length or duration of the haptic effects themselves. Conversely, decreasing the speed may elongate the aforementioned signal and/or increase the duration between the haptic effects.

At 309, the etching editor may store the original and/or the modified etching input (collectively, the "etching input"), and transmit the etching input to a remote device. The etching input may be stored as a standalone haptic file, or alternatively, may be stored as part of the image or video file. Subsequently, the etching input may be exchanged with other end user devices, or alternatively, may be exchanged with a remote server such that the etching input may be retrieved by other end user devices. In either case, other end user devices may be configured to retrieve the etching input, at 310. For example, the etching input may be exchanged as part of a messaging or video sharing application. Other end user devices may render and retrieve the etching input and the corresponding board or canvas, at 311 and 312. In addition, other users may add, delete, or otherwise modify the etching input.

Figure 4:
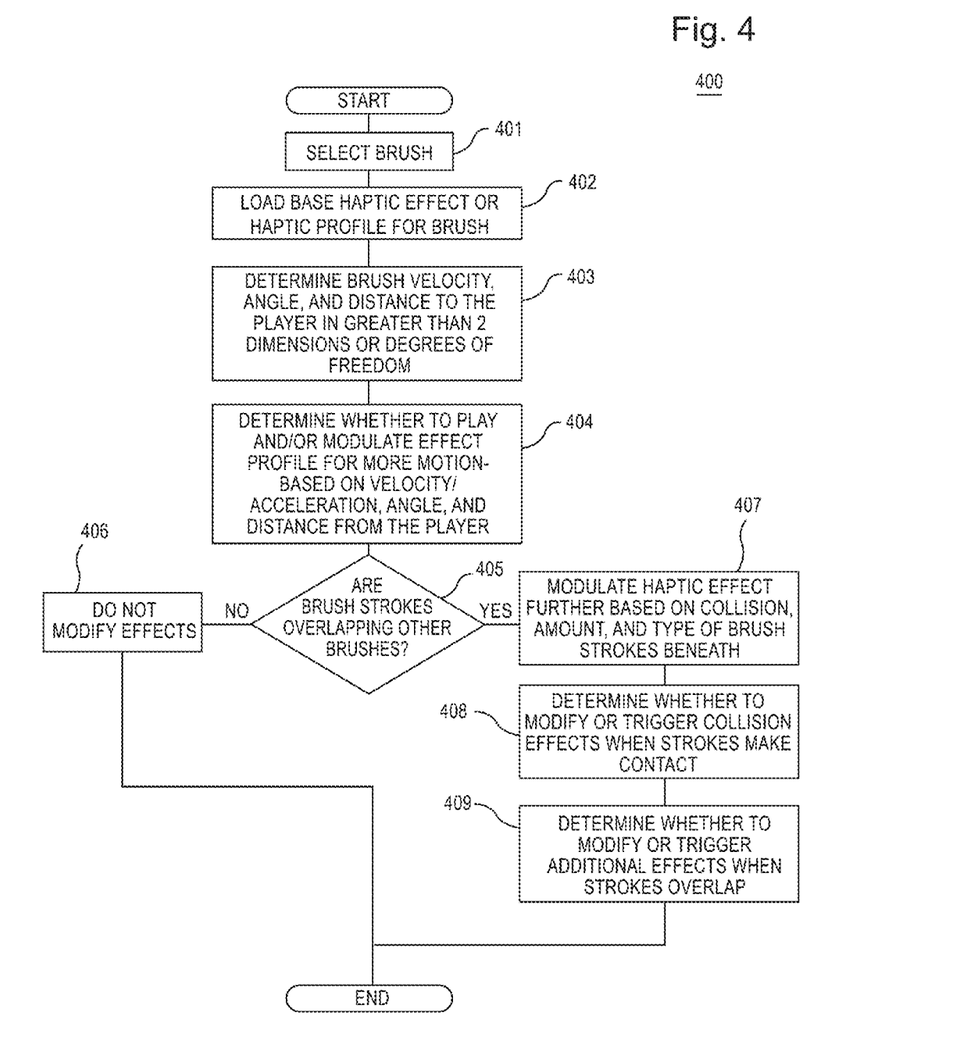
FIG. 4 illustrates a flow diagram of the functionality for rendering the haptic effects in virtual reality according to an example embodiment of the present invention.
Figure 8:
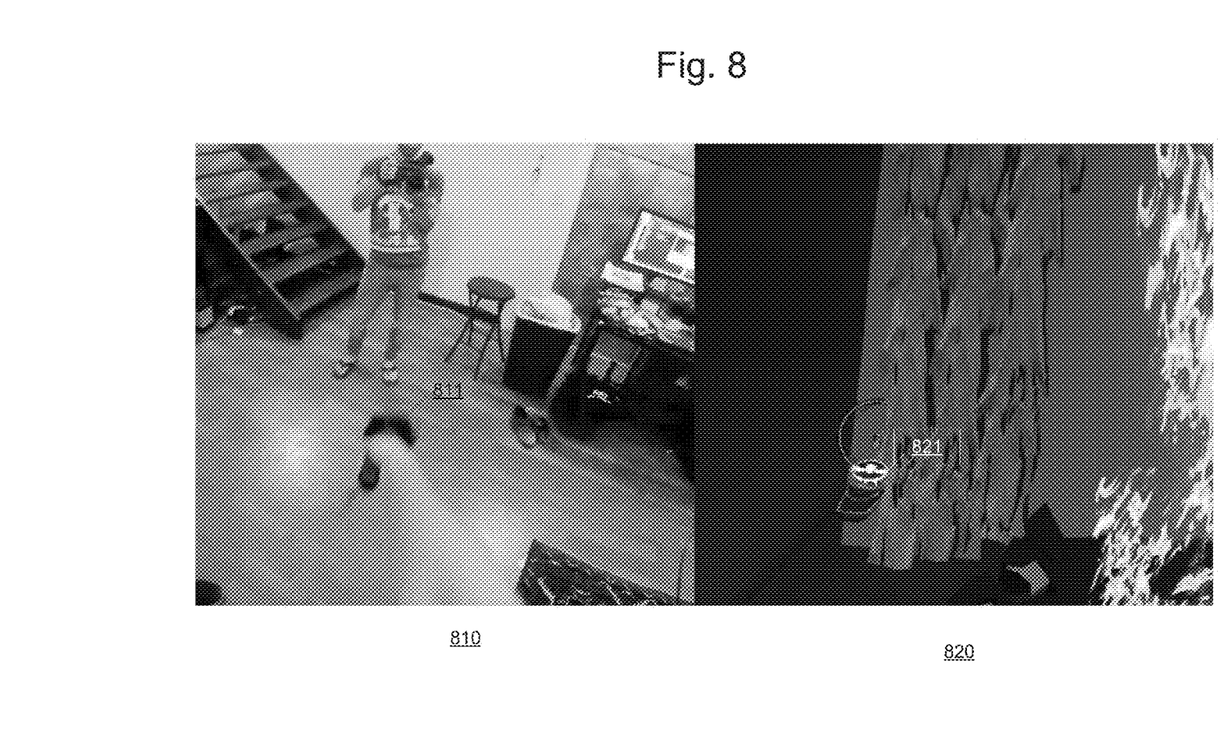
FIG. 8 illustrates a three dimensional brush disposed within a virtual reality space according to an example embodiment of the present invention.

FIG. 4 illustrates a flow diagram of functionality 400 for rendering haptic effects using a haptically enabled drawing brush in three dimensional virtual reality spaces according to an example embodiment of the present invention. The embodiments of FIG. 4 (and FIG. 5) may be implemented using one or more electronic devices to achieve a virtual reality space, such as virtual reality glasses and/or a three dimensional brush. Example three dimensional brush 821 and virtual reality space 820 are depicted in FIG. 8.

Within functionality 400, the user selects one or more brushes (e.g., a three dimensional brush that is configured as a paint brush, marker, erasure, laser, etc.), at 401. Based on the selected brush, a base haptic effect or the haptic effect profile may be determined for the selected brushes, at 402. As described above, each brush type may include a corresponding haptic profile that may be retrieved from a haptic library (not shown) upon selection.

Next, at 403, functionality 400 determines one or more movement characteristics of the selected brush input, based on the input device (e.g., a three dimensional brush or stylus). For example, functionality 400 may track in real-time the velocity, angle, distance to the user, height, and the like of the selected brush. The movement characteristics may be determined in greater than two dimensions or degrees of freedom. Based on the movement characteristics of the selected brush, functionality 400 further determines haptic rendering characteristics of the selected brush, at 404. For example, the base haptic effect or haptic effect profile may be modulated according to the selected brush's velocity, acceleration, angle, and distance from the user.

In addition, functionality 400 may determine whether brush strokes overlap between brushes, at 405. If there are no collisions between brush strokes, the haptic effects associated with the etching inputs may not be modified, at 406. However, if there are collisions between brush stokes, functionality 400 may modulate or otherwise modify the haptic effects according to the collision characteristics, at 407. For example, collision characteristics may include the number of collisions, collision area, brush speed, type of brush stroke, and the like. Subsequently, at 408, functionality 400 determines whether to modify or trigger collision effects when brush strokes make contact. Similarly, at 409, functionality 400 determines whether to modify or trigger additional effects when brush strokes overlap.

Figure 5:
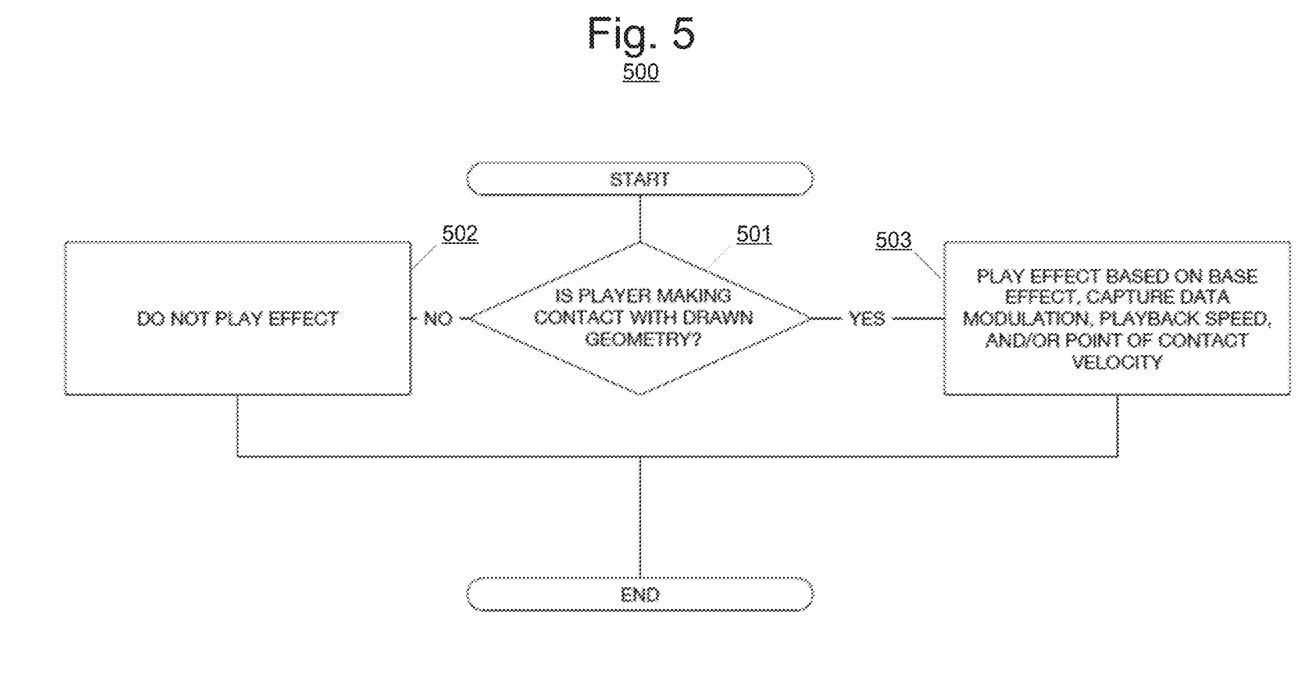
FIG. 5 illustrates a flow diagram of the functionality for rendering the haptic effects when the user is interacting with the etching input according to an example embodiment of the present invention.

FIG. 5 illustrates a flow diagram of functionality 500 for rendering or playing back haptic effects when a user is interacting with a prepared etching input according to an example embodiment of the present invention. The user may have received the etching input via a transmitted message. At the outset, functionality 500 determines whether the user is making contact with the etching input, at 501. If the user is not making contact with the etching input, the haptic effects associated with the etching input are not rendered, at 502. However, if the user is making contact with the etching input, then the haptic effects associated with the etching input are rendered, at 504. For example, the haptic effects may be rendered based on the base haptic effect, haptic effect profile, capture data modulation, playback speed, and/or point of contact velocity.

In some example embodiments, functionality 500 may vary depending on whether the etching input and corresponding haptic effects are being rendered in a real or altered timescale. In other example embodiments, functionality 500 may vary depending on the location of user's hands (or controllers) in the virtual reality space. In yet another example, the user may wear a full body haptic suit as the user walks (or other gestures or motions) through brush strokes (e.g., actuator on leg would activate if your leg passes through brush stroke). In yet other example embodiments, the duration or period of time that the user makes contact with the brush, and the velocity of the user hand when contacting the input etching may determine the haptic output. For example, the user may scrub his or her hand through the etching input so as to feel the effects at the times when they were drawn. In this example, the haptic effects may be modified based on how quickly the user's hand is moving through the etching input. In another example, the user's hand may pass through three dimensional shapes, which causes sensations that are entirely new effects.

FIG. 6 illustrates a user interface for a haptic-enabled etching and messaging application (e.g., tactile chat) according to an example embodiment of the present invention.

As shown in FIG. 6, first user 610 may generate etching input 611 on user selected board 616 implemented by surface 116 of FIG. 1. As described above, board 616 may include various media items, including static images, videos, and the like. In addition, first user 616 may generate etching input 611 using one or more selected brushes (e.g., paint brush, marker, erasure, laser, etc.) and an input device (e.g., stylus, finger, etc.). Each of the brush types may include a corresponding haptic profile that may be retrieved from a haptic library (not shown) upon selection. Similarly, second user 620 also may generate an etching input on user selected board 626. Alternatively, second user 620 may further modify the etching input on board 616 after it is received from first user 610.

Upon entry of etching input 611, the composite of etching input 611, corresponding haptic effects, and the underlying board 616 (e.g., image or video file) may be exchanged between first user 610 and second user 620. Alternatively, the composite of etching input 611, corresponding haptic effects, and the underlying board 616, may be uploaded to a server for retrieval by other end users. While the above examples show an etching experience between two users, the embodiments of the present invention are not so limited. The embodiments contemplate multiple users, multiple actuators, and multiple input and playback devices. Multi-touch gesture inputs can allow for changes in texture, strength, visuals, and/or multiple brushes can be mapped to different fingers/input peripherals.

The etching inputs may be input by the user's hand or finger. Alternatively, a stylus or other input mechanism may be used. For example, the physical movement of the device, such as shaking the device and/or drawing a design with the device (e.g., a heart, square, or other shapes) may be used to generate the etching input. In another example, the etching brushes or tools may be used to input an etching or drawing. In some instances, the selected brushes may be configured to erase or otherwise block out all or a portion of selected board 616, 626.

As the etching is input, a processor (e.g., processor 102 of FIG. 1) is configured to render visual and/or haptic effects according to various parameters of the input etching. In some embodiments, the speed, pressure, and/or other parameters of the captured etched input may be used. Upon completion of the etching, a playback preview can be provided to the user. In addition, post-production parameters may be modified, such as options to reverse, repeat, post-input brush change, change speed, change pressure, and other like options may be provided within an editing mode. Here, the user has the ability to preview completed input etchings with additional post-input filters, the ability to send and receive the completed etching as intended by the creator, the ability to designate the input etching as temporary and the ability to save the input etching such that either first user 610 or second user 620 can add, modify, remove, reapply the same or different filters.

The captured input etching may be modified in advance of rendering playback. For example, the captured etching may be rendered at the same speed as the original input. In another example, the playback of the captured etching may be varied according to user preferences. Here, the user may select an option to maintain or disregard relativity of the input speed. Thus, etchings are not always rendered at an identical rate regardless of input. In yet another example, touch enabled devices, such as pressure sensitive multi-touch input devices may be used to track and render the captured etching at varying pressure values.

In another example embodiment, such as the messaging application 601, first user 610 selects board 616, and further selects one or more brushes. First user 610 may begin by using touch gestures to draw the desired etching (e.g., a smiling face, heart, tic-tac-toe entry, etc.). Haptic effects and other visual effects of the selected brush may be dynamically determined according to brush style, background, speed of etching, etc. Upon completion of the input etching, first user 610 selects the "send" function and the input etching is stored and sent, at the same rate as the input (and with the same visuals/haptics), for both first user 610 and second user 620 within chat windows 612, 622. In some instances, first user 610 also can alter the playback speed and/or other characteristics of the input etching prior to sending the input etching to second user 620.

In yet another example embodiment, a messaging application 601 may be used as part of a social media application (e.g., Facebook or Instagram). In this example, the user may view the images or videos of another user. In addition, the user may desire to do more than comment, and may select to input an etching on the image or video. Being able to select many brushes of unique visual and haptic style, the user may circle one or more portions of the selected image or video. Alternatively, the user may draw an arrow pointing one portion of the selected image or video. Upon the end of the gestural input, the user may select an option to speed up the playback (e.g., with a slider user input element). Subsequently, the input etching may be rendered according to the desired playback speed. As the playback proceeds, any users viewing the image or video may further modify the speed of the input etching. The user may further select a portion of the input etching (e.g., the arrow) by circling around it to form a selection, and select the option to repeat the portion of the etching or animation multiple times. In this example, upon playback, the input etching is rendered, but the arrow may be rendered the desired number of times instead of once.

Figure 7:
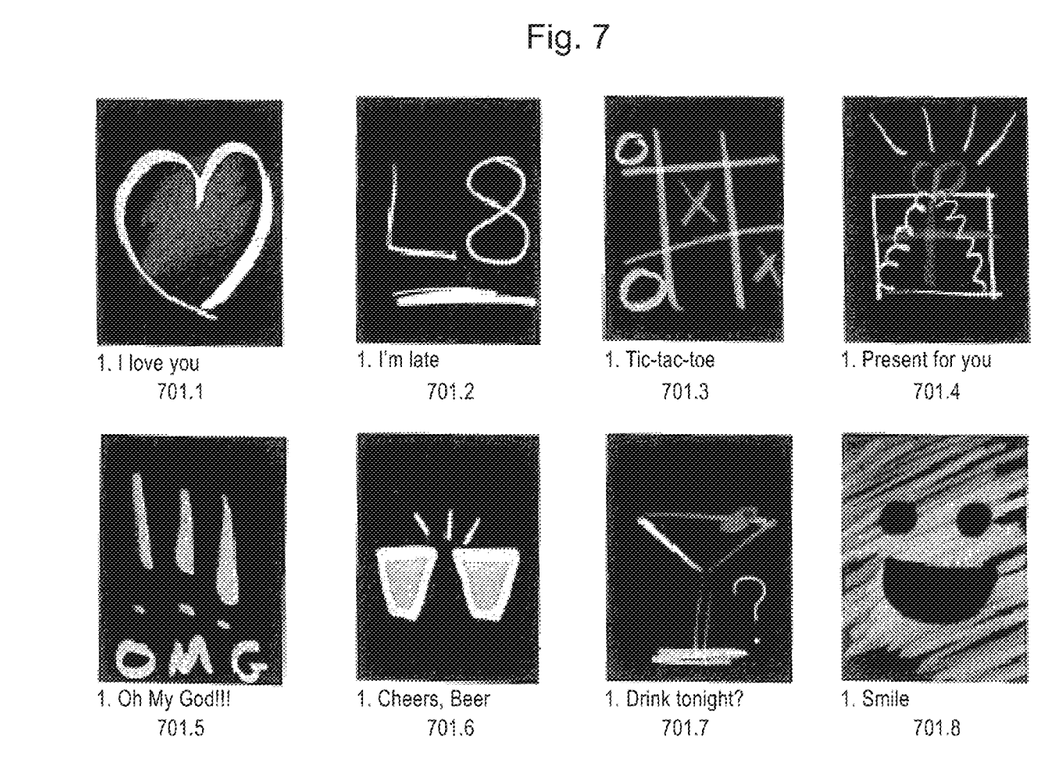
FIG. 7 illustrates a plurality of etchings according to example embodiments of the present invention.

FIG. 7 illustrates a plurality of etchings 701.1-701.8 according to example embodiments of the present invention. Although countless etching inputs are feasible, example etchings 701.1-701.8 visually and haptically render love, lateness, games, presents, surprise, salutations, invitations, and similes, respectively.

FIG. 8 illustrates three dimensional brush 821 disposed within a virtual reality space 820 according to an example embodiment of the present invention. Three dimensional brush 821 may include a virtual reality or tilt brush. In the example rendering of FIG. 8, reality space 810 and the corresponding virtual reality space 820 are shown. Similarly, three dimensional brush 811 is shown within reality space 810, and corresponding three dimensional brush 821 is shown within virtual reality space 820.

As described above, the embodiments described herein provide the systems and methods for dynamically rendering the etching input. The etching inputs may be applied to enhance the exchange of interactive media messages. In addition, the speed, pressure, and/or other parameters of the captured etching input may be modified in advance of rendering playback and in order to further enhance the haptic experience of the user.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A system comprising:
   a processor
   a touch surface comprising a sensor and configured to detect user input; and a non-transitory memory, wherein the non-transitory memory comprises instructions for:

capturing an etching input that is applied to an image or video file;

determining a haptic effect that corresponds to the etching input, the haptic effect depending on a type of etching input;

generating a modified image or modified video file that includes the etching input and a modification to one or more parameters of the haptic effect; and providing a preview of the modified image or video file.

2. The system according to claim 1, wherein the preview is provided to render the etching input.

3. The system according to claim 1, further comprising instructions for modifying one or more parameters of the etching input, wherein the parameters of the etching input include at least one of speed, pressure, direction, repetition, or type of etching input.

4. The system according to claim 1, wherein the parameters of the haptic effect include at least one of frequency or duration.

5. The system according to claim 1, wherein the etching input is determined according to one or more physical movements of the system.

6. The system according to claim 1, wherein each type of etching input corresponds to a haptic profile.

7. The system according to claim 1, further comprising instructions for transmitting the modified image or modified video file.

8. A method comprising:

capturing, at a touch surface configured to detect user input, an etching input that is applied to an image or video file;

determining a haptic effect that corresponds to the etching input, the haptic effect depending on a type of etching input;

generating a modified image or modified video file that includes the etching input and a modification to one or more parameters of the haptic effect; and providing a preview of the modified image or video file.

9. The method according to claim 8, wherein the preview is provided to render the etching input.

10. The method according to claim 8, further comprising modifying one or more parameters of the etching input, wherein the parameters of the etching input include at least one of speed, pressure, direction, repetition, or type of etching input.

11. The method according to claim 8, wherein the parameters of the haptic effect include at least one of frequency or duration.

12. The method according to claim 8, wherein the etching input is determined according to one or more physical movements of a device.

13. The method according to claim 8, wherein each type of etching input corresponds to a haptic profile.

14. The method according to claim 8, further comprising instructions for transmitting the modified image or modified video file.

15. A non-transitory computer readable storage medium storing one or more programs configured to be executed by a processor, the one or more programs comprising instructions for:

capturing, at a touch surface configured to detect user input, an etching input that is applied to an image or video file;

determining a haptic effect that corresponds to the etching input, the haptic effect depending on a type of etching input;

generating a modified image or modified video file that includes the etching input and a modification to one or more parameters of the haptic effect; and providing a preview of the modified image or video file.

16. The non-transitory computer readable storage medium according to claim 15, wherein the preview is provided to render the etching input.

17. The non-transitory computer readable storage medium according to claim 15, further comprising instructions for modifying one or more parameters of the etching input, wherein the parameters of the etching input include at least one of speed, pressure, direction, repetition, or type of etching input.

18. The non-transitory computer readable storage medium according to claim 17, wherein the parameters of the haptic effect include at least one of frequency or duration.

19. The non-transitory computer readable storage medium according to claim 15, wherein the etching input is determined according to physical movement of a device.

20. The non-transitory computer readable storage medium according to claim 15, wherein each type of etching input corresponds to a haptic profile.

* * * * *